Sept. 5, 1939.  H. DEBOR  2,171,973
SAFETY DEVICE FOR PRESSURE VESSELS
Filed Aug. 31, 1936
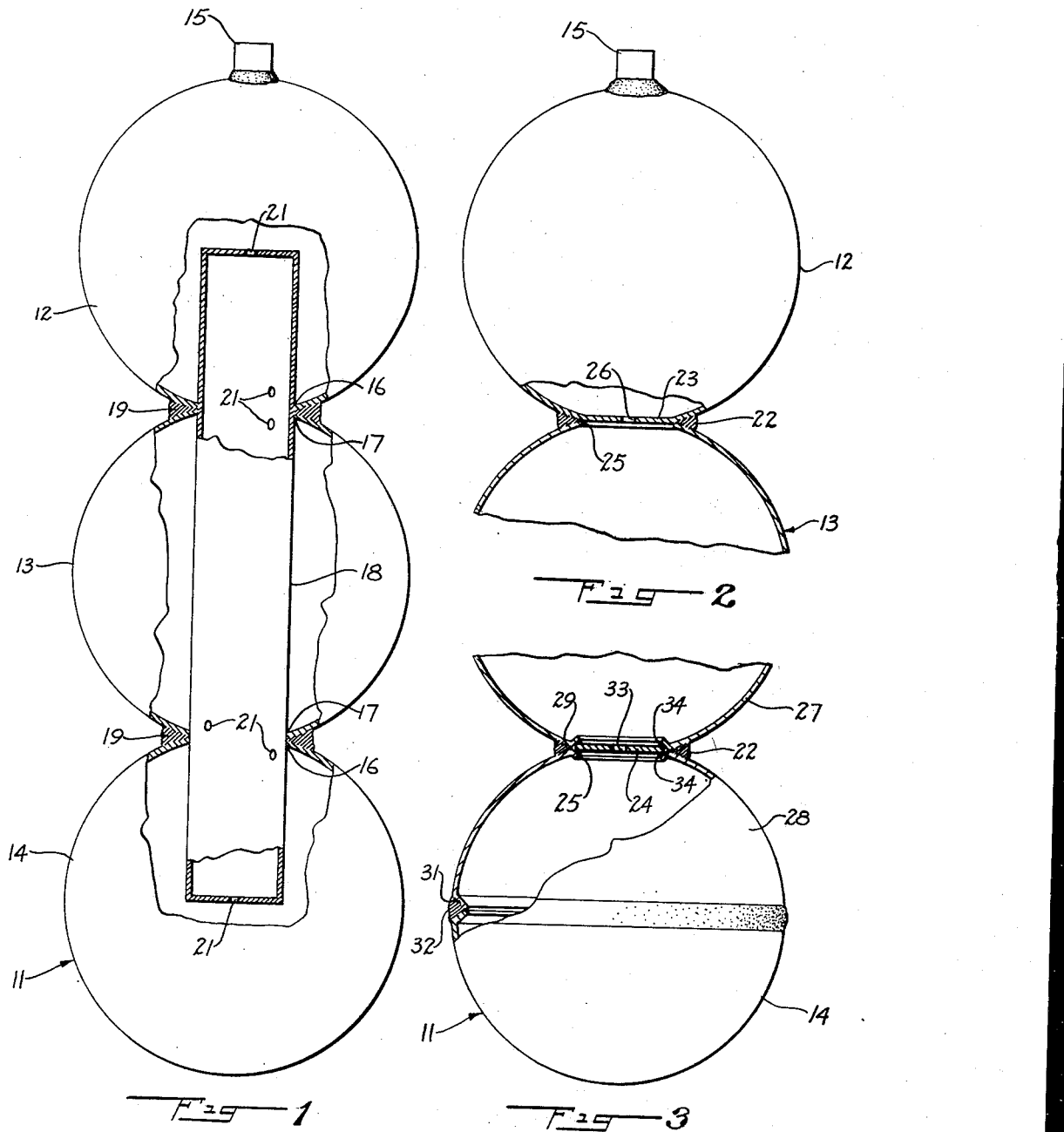
INVENTOR
HERMANN DEBOR
BY
*E. Greenewald*
ATTORNEY Patented Sept. 5, 1939

2,171,973

UNITED STATES PATENT OFFICE 2,171,973

SAFETY DEVICE FOR PRESSURE VESSELS

Hermann Debor, Munich, Germany, assignor to Dominion Oxygen Company, Limited, a corporation of Canada Application August 31, 1936, Serial No. 98,765
In Germany September 5, 1935

12 Claims. (Cl. 220—3)

This invention relates to metallic containers, and more particularly to safety devices for use in pressure vessels consisting of a series of interconnected and intersecting hollow spheroids.

Such vessels are extensively used to sustains relatively high pressures, considerably in excess of those ordinarily used with cylindrical containers. However, in the event of sudden failure of one of the spheroidal zones, the pressure from the remaining zones may be released very rapidly, producing an explosion of sufficient intensity to constitute a safety hazard. This hazard may be minimized if the flow of the compressed fluid from one zone to another is maintained within reasonable limits.

Accordingly the principal objects of the present invention are to provide a new and improved container comprising interconnected hollow spheroids; and to provide in such a container, methods and apparatus for inhibiting excessively rapid flow of fluid from one spheroidal zone to an adjacent zone. These and other objects of the invention will become apparent from the following description and from the accompanying drawing wherein:

Fig. 1 is an elevational view partly in section of one form of container embodying features of the present invention;

Fig. 2 is a fragmentary elevational view partly in section of another form of container embodying features of the present invention; and Fig. 3 is a fragmentary view similar to Fig. 2 showing a modified form of construction.

Generally speaking, the invention contemplates restricting the size of the passage between adjacent hollow enlarged chambers or globular zones in a pressure vessel so as to inhibit or retard excessively rapid flow of fluid under pressure from one chamber to another in the event that the wall of one chamber is ruptured.

Referring to the drawing and more particularly to Fig. 1, a container or pressure vessel 11 is shown consisting of a plurality of interconnected hollow spheroidal or globular sections 12, 13, and 14. The container may be formed in any desired manner, as by swaging the walls of a cylinder, by casting, by welding spherical sections in line as in Fig. 1, or by welding together alined hemispheroidal sections in the manner indicated in Fig. 3. A filling and discharge neck 15, welded to the spheroid 12, serves as a means for making suitable external connection with the container when the latter is in use. The end sections 12 and 14 are provided with a single aperture 16 for alignment during assembly with the respective apertures 17 formed in opposite sides of each intermediate section 13.

A tube 18, substantially closed at each end, extends through the respective apertures 16 and 17 from the end section 12 to the end section 14, and is sealed in any convenient manner with the respective sections 12, 13, and 14 about the edges of the apertures 16 and 17. Preferably the tube 18 is secured to the respective sections by weld or braze metal 19 deposited in an annular zone between the spheroids at the plane of intersection. The wall of the tube 18 is provided with a plurality of perforations or openings 21, disposed so that at least one perforation communicates with each spheroidal section, through which the fluid must flow in passing from one section to another. By limiting the number and size of the perforations, the flow of fluid between enlarged zones may be restricted to a rate sufficient for filling and for normal discharge. In the event of rupture of one of the spheroidal sections or of a break in the discharge line, the limited area of the perforations retards or restricts the flow between sections and maintains such flow within safe limits.

Referring now more particularly to Figs. 2 and 3, modified constructions embodying the principles of the invention are shown applied respectively to the top and bottom portions of a container 11 consisting of a series of interconnected hollow spheroidal sections 12, 13, and 14 with a filling and discharge connection 15 welded to the end zone or calotte 12. The sections are joined together about the annular constricted zone at each plane of intersection preferably by a deposit of weld metal 22. A safety diaphragm comprising a perforated plate 23 or 24 extends across each aperture 25 formed in the wall of the respective globular sections at the plane of intersection. The manner in which the diaphragms 23 and 24 are secured in position depends somewhat upon the construction of the respective spheroidal sections. If desired, alternate sections may comprise complete hollow spheres, and intermediate sections may comprise hollow spheroids provided with oppositely disposed apertures 25, in which case that portion of the wall of the complete spheres that is disposed adjacent to the respective apertures 25 when the sections are welded together, forms the safety diaphragm. The diaphragm 23, which thus may be integral with the wall of the container, as shown on the section 12 of Fig. 2, is provided with at least one perforation or orifice 26, having a cross-sectional area which is relatively small as compared to the area of each aperture 26, and operating as a metering orifice so as to limit the flow of fluid therethrough. Instead of forming alternate sections as complete spheres and providing two apertures 25 in the intermediate sections, each section may be formed identically as a hollow spheroidal body having a single relatively large aperture 25 at one end, and a relatively small perforation or orifice 26 diametrically opposite. The sections may be aligned during assembly with the large aperture 25 of one section adjacent to the small perforation 26 of an adjoining section as indicated in Fig. 2, after which the parts may be united by the weld metal 22.

As an alternate method of construction a separate diaphragm 24 may be secured in position between the spheroidal sections at the plane of intersection as shown in Fig. 3. In this instance the spheroidal sections preferably are built up of elements, such as hemi-spheroidal shells 27 and 28, to facilitate welding the diaphragm 24 in position during assembly. Each shell 27 and 28 is provided with an aperture 25 opposite the large-diameter end, with the annular portion adjacent to the apertures as well as the portion adjacent to the rim flanged inwardly to form the grooves 29 and 31 respectively when the parts are in assembled relation. Weld metal 32 is deposited in the groove 31 during assembly. The diaphragm 24, which is provided with at least one pressure-reducing orifice 33, is preferably secured within the groove 29 by weld metal 34 prior to the deposit of the metal 22.

Changes may be made in certain details of the herein disclosed containers and the processes of making the same without departing from the principles of the invention or sacrificing its advantages.

I claim:

1. In a pressure vessel having a plurality of interconnected spheroidal zones, a safety device comprising a conduit extending longitudinally with respect to the vessel and communicating with each spheroidal zone through at least one relatively small perforation.

2. In a pressure vessel having a plurality of interconnected spheroidal sections united at the constricted zones at each plane of intersection, a safety device comprising a conduit extending longitudinally through and being sealed with the constricted zones, said conduit communicating with each spheroidal zone through at least one relatively small perforation.

3. Safety device as claimed in claim 2 wherein said conduit comprises a tube having substantially the diameter of the constricted zones, and wherein said tube is welded peripherally to the constricted zones.

4. A pressure vessel comprising a plurality of interconnected and intersecting hollow spheroids, and a perforated diaphragm extending across each plane of intersection of said spheroids.

5. A pressure vessel comprising a plurality of hollow spheroids, each of said spheroids being provided with a relatively large aperture and an oppositely disposed relatively small perforation, said spheroids being aligned in juxtaposed relation with the large aperture of one spheroid substantially coaxial with the small perforation of an adjoining spheroid, said respective spheroids being welded together about the periphery of the apertures.

6. In a pressure vessel having a plurality of interconnected hollow spheroids; a plurality of hemi-spheroidal shells, each of said shells being apertured opposite its large-diameter end, said shells being placed with large-diameter ends opposed and welded together about the periphery of adjacent apertures, and a perforated diaphragm welded about the periphery of adjacent apertures.

7. A pressure vessel comprising a plurality of apertured hemi-spheroidal shells mutually welded together to form a series of interconnected and intersecting hollow spheroids, and a perforated safety device in the path between adjoining spheroids.

8. A pressure vessel comprising a plurality of apertured hemi-spheroidal shells mutually welded together to form a series of interconnected and intersecting hollow spheroids, the edges adjacent the apertures being flanged inwardly to form an annular groove when in the assembled position, and a perforated diaphragm within the groove, said diaphragm and said shells being held in position by weld metal deposited within the groove.

9. A pressure vessel comprising a plurality of spheroidal shells mutually welded together to form a series of interconnected and intersecting hollow spheroids, and a perforated safety device held in the path of flow between adjoining spheroids by weld metal deposited at the plane of intersection.

10. A pressure vessel comprising a plurality of juxtaposed hollow spheroids, and a safety device provided with a pressure-reducing orifice interposed in the path of flow between adjoining spheroids.

11. A pressure vessel for containing fluids under high pressure comprising a plurality of juxtaposed metallic globular zones, adjacent zones being interconnected; and a retarding device interposed in the path of flow between adjoining globular zones including a relatively small passage operative as a metering orifice whereby the flow of fluid along said path is restricted to within predetermined safe limits in the event of failure under pressure of one of said zones.

12. A metallic container adapted to withstand high internal pressure comprising a metallic casing consisting of a plurality of interconnected hollow substantially spherical zones, substantially spherical calottes closing the zones at the ends of said casing, the geometric centers of said zones and said calottes being located in and along the main longitudinal axis of the container; and wall-like retarding means provided with at least one aperture intervening in the path of flow between adjacent substantially spherical portions, said means being adapted to retard the flow of fluid between such substantially spherical portions.

HERMANN DEBOR.